United States Patent
Li et al.

(10) Patent No.: US 12,107,219 B2
(45) Date of Patent: Oct. 1, 2024

(54) POLYMER, POLYMER ELECTROLYTE AND LITHIUM ION BATTERY

(71) Applicant: SHENZHEN BTR NEW ENERGY TECHNOLOGY RESEARCH INSTITUTE CO., LTD., Shenzhen (CN)

(72) Inventors: Junhuan Li, Shenzhen (CN); Gengbiao Xu, Shenzhen (CN); Chenglin Yang, Shenzhen (CN); Zikun Li, Shenzhen (CN); Youyuan Huang, Shenzhen (CN)

(73) Assignee: SHENZHEN BTR NEW ENERGY TECHNOLOGY RESEARCH INSTITUTE CO., LTD., Shenzhen (CN)

( * ) Notice: Subject to any disclaimer, the term of this patent is extended or adjusted under 35 U.S.C. 154(b) by 0 days.

(21) Appl. No.: 18/687,843

(22) PCT Filed: Aug. 4, 2023

(86) PCT No.: PCT/CN2023/111158
§ 371 (c)(1),
(2) Date: Feb. 29, 2024

(87) PCT Pub. No.: WO2024/131081
PCT Pub. Date: Jun. 27, 2024

(65) Prior Publication Data
US 2024/0274875 A1    Aug. 15, 2024

(30) Foreign Application Priority Data

Dec. 19, 2022 (CN) .......................... 202211635185.4

(51) Int. Cl.
*H01M 10/0565* (2010.01)
*C08G 65/22* (2006.01)
(Continued)

(52) U.S. Cl.
CPC ........ *H01M 10/0565* (2013.01); *C08G 65/22* (2013.01); *C08G 65/331* (2013.01); *H01M 10/0525* (2013.01); *H01M 2300/0082* (2013.01)

(58) Field of Classification Search
CPC ........ H01M 10/0565; H01M 10/0525; H01M 2300/0082; C08G 65/22; C08G 65/331; C08G 65/14; C08G 65/20
(Continued)

(56) References Cited

U.S. PATENT DOCUMENTS

2016/0147155 A1    5/2016  Takizawa et al.
2017/0077517 A1*   3/2017  Nishide ................. H01M 4/606
(Continued)

FOREIGN PATENT DOCUMENTS

CN    108400335 A    8/2018
CN    110637038 A    12/2019
(Continued)

OTHER PUBLICATIONS

Li et al., A PEO-Based Gel Polymer Electrolyte for Lithium-Ion Batteries, Apr. 14, 2017, RSC Advances, 7, pp. 23495 and 23498 (Year: 2017).*

(Continued)

*Primary Examiner* — James M Erwin
*Assistant Examiner* — John S Medley
(74) *Attorney, Agent, or Firm* — Bayramoglu Law Offices LLC (57) ABSTRACT

A polymer, a polymer electrolyte and a lithium ion battery are provided. The polymer includes a main chain and side chains of the polymer, the side chains contain conjugated cyclic groups and epoxy multi-element cyclic groups; the conjugated cyclic group is selected from saturated or unsaturated C10-C20 conjugated aromatic groups; the epoxy (Continued)

multi-element cyclic group is selected from saturated or unsaturated C3-C8 epoxy multi-element cyclic groups; the main chain of the polymer is selected from polyalkoxy ether. The polymer, the polymer electrolyte and the lithium ion battery can improve interaction between the polymer electrolyte and an active substance in an electrode plate, increase the adhesion of the polymer electrolyte, avoid detachment occurring at an interface between the plate and the electrolyte, and improve the interface stability of the battery.

15 Claims, 2 Drawing Sheets

(51) Int. Cl.
*C08G 65/331* (2006.01)
*H01M 10/0525* (2010.01)

(58) Field of Classification Search
USPC .......................................................... 429/312
See application file for complete search history.

(56) References Cited

U.S. PATENT DOCUMENTS

| | | |
|---|---|---|
| 2019/0058217 A1 | 2/2019 | Ahn et al. |
| 2020/0403244 A1* | 12/2020 | Wang ..................... H01M 4/625 |
| 2021/0043934 A1* | 2/2021 | Shin ....................... H01M 4/366 |
| 2021/0095065 A1* | 4/2021 | Lee ....................... C08F 293/005 |
| 2023/0231139 A1* | 7/2023 | Li ............................ H01M 4/62 |
| | | 429/231.8 |

FOREIGN PATENT DOCUMENTS

| | | |
|---|---|---|
| CN | 111793323 A | 10/2020 |
| CN | 116284723 A | 6/2023 |
| JP | 2017049374 A | 3/2017 |

OTHER PUBLICATIONS

Jonathan M. Millican, et al., Synthesis and characterisation of a mussel-inspired hydrogel film coating for biosensors, European Polymer Journal, 2021, pp. 1-10, vol. 153.

GB/T 1040-1992, Plastics-Determination of tensile properties, China National Standards, 1992, China Oil and Chemical Industry Association.

* cited by examiner

POLYMER, POLYMER ELECTROLYTE AND LITHIUM ION BATTERY

CROSS REFERENCE TO THE RELATED APPLICATIONS

This application is the national phase entry of International Application No. PCT/CN2023/111158, filed on Aug. 4, 2023, which is based upon and claims priority to Chinese Patent Application No. 202211635185.4, filed on Dec. 19, 2022, the entire contents of which are incorporated herein by reference.

TECHNICAL FIELD

The present application relates to the technical field of solid electrolytes, particularly to a polymer, a polymer electrolyte and a lithium ion battery.

BACKGROUND

A lithium-ion secondary battery has the advantages of high energy density, long cycle service life, no memory effect and the like, and therefore has been rapidly developed in recent years and widely applied to the fields such as small energy storage devices, electric vehicles and smart grids. However, a lithium ion battery often uses a small organic molecule liquid electrolyte solution, lithium accumulation is formed on the surface of an anode due to limited lithium deintercalation dynamics in the battery, leading to lithium dendrites which can pierce a diaphragm to cause a short circuit between the cathode and the anode, forming safety hazard. For the solid battery, in essence, the flammable organic electrolyte solution is replaced with the stable solid electrolyte, thereby improving the safety performance of the battery. Compared with a cathode side, the volume of an anode plate can be significantly changed in the deintercalation process of lithium to generate expansion and contraction. In view of the limited adhesive strength between the solid electrolyte and an anode active substance, detachment easily occurs at the interface, which severely limits the service life and reliability of the battery and finally causes the failure of a battery system.

Hence, it is required for the solid battery to have extremely strong adhesion between the solid electrolyte and the anode, which promotes the generation of a strong adhesive force between the anode plate and the electrolyte, so as to effectively bear the volume change in the process of charging and discharging, and avoid the generation of internal stress of the battery. The excessive expansion of the anode reduces the porosity inside the battery, thereby shrinking the lithium ion migration channel and thus inducing the precipitation of lithium and generation of lithium dendrites, and finally affecting the interface stability of the battery.

However, the existing anode plate is often made up of graphite or silica-based material coated with a carbon layer. The slippage and detachment easily occur on the surface of the carbon layer, which is hard to avoid by utilizing the ordinary polymer electrolyte considering its poor adhesive property, resulting in the detachment at the interface of the anode.

SUMMARY

In view of this, the present application provides a polymer, a polymer electrolyte and a lithium ion battery, thereby improving interaction between the polymer electrolyte and the active substance in electrode, increasing the adhesion of the polymer electrolyte, avoiding detachment of the interface between the plate and the electrolyte and improving the interface stability of the battery.

In a first aspect, the present application provides a polymer, the polymer including a main chain and side chains, and the side chains containing conjugated cyclic groups and epoxy multi-element cyclic groups.

In some embodiments, the conjugated cyclic group is selected from saturated or unsaturated C10-C20 conjugated aromatic groups.

In some embodiments, the epoxy multi-element cyclic group is selected from saturated or unsaturated C3-C8 epoxy multi-element cyclic groups.

In some embodiments, the main chain of the polymer is selected from polyalkoxy ether.

In some embodiments, the conjugated aromatic group is selected from at least one of saturated or unsaturated naphthyl, acenaphthenyl, terpenyl, phenanthryl, anthracyl, fluoranthenyl, pyrenyl and biphenyl.

In some embodiments, the epoxy multi-element cyclic group is selected from at least one of epoxy ethyl, epoxy propyl, dioxocyclopropyl, oxocyclobutyl, oxocyclopentyl and pyranyl, oxocyclohexyl and dioxocyclohexyl.

In some embodiments, the molecular formula of the polymer is represented by Formula I:

Formula I wherein, $R_1$ is the conjugated cyclic group, and $R_2$ is the epoxy multi-element cyclic group;

$n_1$ and $n_2$ are each selected from natural numbers from 1 to 5; $n_3$ is in a range from 5 to 50;

a, b, c and d are each selected from natural numbers from 0 to 5.

In some embodiments, a, b, c and d are each selected from 0, 1 or 2.

The present application further provides a polymer electrolyte, the polymer electrolyte including an electrolyte solution and the above-mentioned polymer.

In some embodiments, the mass percentage of the polymer in the polymer electrolyte is W %, and $20 \leq W \leq 80$.

In some embodiments, in an infrared absorption spectrum, the light transmission peak intensity of the polymer electrolyte in a wavelength range of 2950 cm$^{-1}$-3000 cm$^{-1}$ is $A_1$, the light transmission peak intensity of the polymer electrolyte in a wavelength range of 1150 cm$^{-1}$-1180 cm$^{-1}$ is $A_2$, and $2 \leq A_1/A_2 \leq 4$.

In some embodiments, the peeling strength of the polymer electrolyte is T mN/mm, and $T \geq A_1/A_2 * W * 300$.

In some embodiments, the ion conductivity of the polymer electrolyte is from $0.7 \times 10^{-3}$ S/cm to $2.0 \times 10^{-3}$ S/cm.

In some embodiments, the electrochemical stability window of the polymer electrolyte is from 4.5 V to 6 V.

In some embodiments, the polymer electrolyte is a polymer electrolyte film.

In some embodiments, the thickness of the polymer electrolyte film is from 5 μm to 300 μm.

In some embodiments, the tensile strength of the polymer electrolyte film is from 0.72 Mpa to 5 Mpa.

In some embodiments, the peeling strength of the polymer electrolyte film is from 350 mN/mm to 650 mN/mm.

In a second aspect, the present application provides a lithium ion battery, the lithium ion battery including the polymer electrolyte according to the first aspect.

The technical solution of the present application at least has the following beneficial effects:

The side chain of the molecular chain of the polymer provided in the present application has epoxy multi-element cyclic groups which have ring tension and are prone to ring opening reaction. When being applied to the solid electrolyte, the side chain can react with the drawback of the carbon layer structure on the surface of the electrode active substance (for example a silica-based anode material and a graphite anode material) to form chemical bonding, thereby improving the connection strength between the polymer chain and the electrode active substance, and increasing the adhesion of the polymer electrolyte; in addition, the side chain of the molecular chain of the polymer adjacent to the epoxy multi-element cyclic group is the conjugated cyclic group, a large π bond of a conjugated ring in the conjugated cyclic group has delocalized π electron cloud, can form an approximate multi-electron conjugation effect with the oxygen atom lone pair electrons of the epoxy multi-element cyclic group, can enhance the nucleophilicity of oxygen atoms in the epoxy multi-element cyclic group and increase the polarity of a carbon-oxygen bond, promote ring opening reaction of the epoxy multi-element cyclic group, and improve the activity of the ring opening reaction.

Further, the side chain of the molecular chain of the polymer has the conjugated cyclic group, which can form π-π interaction with the carbon layer on the surface of the electrode active substance to generate a strong interaction force and promote the adhesive strength of the polymer on the surface of the anode, and π-π interaction can promote the polymer to preferably deposit on the interface of the polymer, an interface coating is formed after the polymer is deposited so as to promote the interface dielectric constant between the active substance and the electrolyte layer to generate a stronger dielectric shielding effect, an internal potential field is impaired under the action of the polymer coating, and the directional migration of lithium ions at lithium dendrites is reduced, thereby reducing the probability of the lithium dendrites piercing the polymer coating and improving the interface stability of the solid battery.

DETAILED DESCRIPTION OF THE EMBODIMENTS

The following descriptions are preferred embodiments of the present disclosure, it should be noted that several improvements and modifications can be also made by persons of ordinary skill in the art without departing from the principle of the examples of the present disclosure, and these improvements and modifications are deemed as the scope of protection of the examples of the present disclosure.

The embodiments of the present application provide a polymer, the polymer including a main chain and side chains of the polymer, and the side chains containing conjugated cyclic groups and epoxy multi-element cyclic groups.

In the above solution, the side chain of the molecular chain of the polymer provided in the present application has epoxy multi-element cyclic groups which have ring tension and are prone to ring opening reaction. When being applied to the solid electrolyte, the side chain can react with the drawback of the carbon layer structure on the surface of the electrode active substance (for example a silica-based anode material and a graphite anode material) to form chemical bonding, thereby improving the connection strength between the polymer chain and the electrode active substance, and increasing the adhesion of the polymer electrolyte; in addition, the side chain of the molecular chain of the polymer adjacent to the epoxy multi-element cyclic group is the conjugated cyclic group, a large π bond of a conjugated ring in the conjugated cyclic group has delocalized π electron cloud, can form an approximate multi-electron conjugation effect with the oxygen atom lone pair electrons of the epoxy multi-element cyclic group, can enhance the nucleophilicity of oxygen atoms in the epoxy multi-element cyclic group and increase the polarity of a carbon-oxygen bond, promote ring opening reaction of the epoxy multi-element cyclic group, and improve the activity of the ring opening reaction Further, the side chain of the molecular chain of the polymer has the conjugated cyclic group, which can form π-π interaction with the carbon layer on the surface of the electrode active substance to generate a strong interaction force and promote the adhesive strength of the polymer on the surface of the anode, and π-π interaction can promote the polymer to preferably deposit on the interface of the polymer, an interface coating is formed after the polymer is deposited so as to promote the interface dielectric constant between the active substance and the electrolyte layer to generate a stronger dielectric shielding effect, an internal potential field is impaired under the action of the polymer coating, and the directional migration of lithium ions at lithium dendrites is reduced, thereby reducing the probability of the lithium dendrites piercing the polymer coating and improving the interface stability of the solid battery.

The main chain of the molecular chain of the polymer has an etheroxy group, the main chain is in an irregular and flexible structure, which increases the regularity of the molecular chain so that the molecular group of the side chain connected with the main chain can freely stretch, the side chain easily generates complexation with a lithium salt in the electrolyte and an organic solvent so as to improve the dissolution and absorption ability of the main chain on the lithium salt and the electrolyte solution, increase the flexibility of the main chain, promote the movement resistance of the side chain to become smaller and improve the adhesion of the polymer electrolyte.

As an optional technical solution of the present application, the conjugated cyclic group is selected from saturated or unsaturated C10-C20 conjugated aromatic groups.

As an optional technical solution of the present application, the epoxy multi-element cyclic group is selected from saturated or unsaturated C3-C8 epoxy multi-element cyclic groups.

As an optional technical solution of the present application, the main chain of the polymer is selected from polyalkoxy ether.

In some embodiments, the conjugated aromatic group is selected from at least one of saturated or unsaturated naphthyl, acenaphthenyl, terpenyl, phenanthryl, anthracyl, fluoranthenyl, pyrenyl and biphenyl.

It should be noted that a conjugated large π ring together with the carbon layer on the particle surface of the electrode material can form π-π interaction, the interaction force can reduce the co-insertion reaction of the electrolyte solvent, decrease the peeling of the organic solvent in the electrolyte on the carbon layer on the particle surface of the electrode material, improve the structure stability of the electrode material in the process of charging and discharging and facilitate the improvement of the charging-discharging cycle stability of the battery. Furthermore, the conjugated aromatic groups have certain rigidity, and can be regularly arranged with each other, which is beneficial to improving the mechanical strength of the aggregation state of the molecular chain and then improving the mechanical strength of the electrolyte. Under the catalytic action of adjacent conjugated aromatic groups, the epoxy multi-element cyclic groups on side groups of molecular chains of different polymers can bond with each other to produce cross-linking between molecular chains to form a polymer cross-linking network structure, thereby enhancing the chemical stability of polymer chains, improving the electrochemical stability window of the electrolyte, and also facilitating the improvement of tensile strength of materials.

As an optional technical solution of the present application, the epoxy multi-element cyclic group is selected from at least one of epoxy ethyl, epoxy propyl, dioxocyclopropyl, oxocyclobutyl, oxocyclopentyl and pyranyl, oxocyclohexyl and dioxocyclohexyl.

It should be noted that the epoxy multi-element cyclic groups of the side chain of the molecular chain of the polymer provided in the present application can react with structural defects on the surface of the carbon layer of the particle surface of the electrode material, for example react with the hydroxyl, amino, or carboxyl on the surface of the carbon layer, thereby improving the connection strength between the molecular chains of the polymer and the electrode active material; in addition, the epoxy multi-element cyclic group of the side chain of the molecular chain of the polymer can also help improving the cross-linking degree between molecular chains to form a polymer cross-linking network structure, thereby enhancing the overall mechanical strength of the polymer electrolyte, and improving the mechanical property of the polymer electrolyte.

As an optional technical solution of the present application, the molecular formula of the polymer is represented by Formula I:

Formula I wherein, $R_1$ is the conjugated cyclic group, and $R_2$ is the epoxy multi-element cyclic group.

$n_1$ and $n_2$ are each selected from natural numbers from 1 to 5; $n_3$ is in a range from 5 to 50;

a, b, c and d are each selected from natural numbers from 0 to 5.

In some embodiments, a, b, c and d are each selected from 0, 1 or 2.

The present application further provides a polymer electrolyte, the polymer electrolyte including the above-mentioned polymer.

As an optional technical solution of the present application, in an infrared absorption spectrum, the light transmission peak intensity of the polymer electrolyte in a wavelength range of 2950 cm$^{-1}$-3000 cm$^{-1}$ is $A_1$, and the light transmission peak intensity of the polymer electrolyte in a wavelength range of 1150 cm$^{-1}$-1180 cm$^{-1}$ is $A_2$, and $2 \leq A_1/A_2 \leq 4$. Specifically, the $A_1/A_2$ ratio specifically may be 2, 2.2, 2.5, 2.8, 3.0, 3.2, 3.4, 3.6, 3.8 or 4, etc, of course, it may also be other values in the above-mentioned range, without limitation.

Where, the corresponding functional group of the polymer electrolyte in a wavelength range of 2950 cm$^{-1}$-3000 cm$^{-1}$ is a C—H bond of a conjugated large n ring in $R_1$ side chain, and the corresponding functional group in a wavelength range of 1150 cm$^{-1}$-1180 cm$^{-1}$ is a C—H bond of the epoxy multi-element ring in $R_2$ side chain. The $A_1/A_2$ ratio is controlled in a range of 2-4, the distribution of the conjugated large π ring and the epoxy multi-element ring in the molecule chain of the polymer can be regulated through proportional control of the quantity of groups, thereby achieving the interaction between the conjugated ring π-π accumulation and the epoxy multi-element ring bond, improving the adhesion of the polymer on the electrode active material, improving the peeling strength of the polymer electrolyte film on the plate, and then improving the stability of the interface.

As an optional technical solution of the present application, the mass percentage of the polymer in the polymer electrolyte is W %, $20 \leq W \leq 80$, specifically it may be 20%, 30%, 40%, 50%, 60%, 70%, 75% or 80%, etc, without limitation herein.

As an optional technical solution of the present application, the peeling strength of the polymer electrolyte is T mN/mm, and $T \geq A_1/A_2*W*300$. It can be understood that with increase in the mass content of the polymer in the polymer electrolyte and increase in proportions of group quantities of the conjugated large π ring and the epoxy multi-element ring, the peeling strength of the polymer electrolyte is gradually improved.

As an optional technical solution of the present application, the polymer electrolyte also includes an electrolyte solution which includes an organic solvent and a lithium salt.

The organic solvent includes a carbonate compound including at least one of ethyl carbonate, propylene carbonate, diethyl carbonate, dimethyl carbonate, methyl ethyl carbonate, ethylene carbonate, propylene carbonate, and butene carbonate. It can be understood that the carbonate compound has a carbonate compound group, the polar group (such as etheroxy group and ester group) contained in the main chain of the polymer has a similar dissolution effect to the carbonate compound, thereby improving the interaction between the organic solvent and the molecular chain of the polymer in the electrolyte solution and then enhancing the absorption capacity of the polymer on the organic solvent in the electrolyte solution.

As an optional technical solution of the present application, the mass percentage of the carbonate compound in the electrolyte solution is 30%-95%, specifically, it may be 30%, 35%, 40%, 45%, 50%, 55%, 60%, 65%, 70%, 75%, or 95%, etc, of course, it may also be other values in the above range, without limitation herein.

As an optional technical solution of the present application, the lithium salt includes at least one of lithium hexafluorophosphate, lithium tetrafluoroborate, lithium difluorophosphate, lithium bis(trifluoromethanesulfonyl)imide, lithium bis(fluorosulfonyl)imide, lithium oxalate or lithium difluorooxalate.

As an optional technical solution of the present application, the concentration of the lithium salt in the electrolyte solution is 0.5 mol/L-2 mol/L, specifically, it may be 0.5 mol/L, 0.7 mol/L, 0.9 mol/L, 1.0 mol/L, 1.2 mol/L, 1.5 mol/L or 2.0 mol/L, etc, of course, it may also be other values in the above range, without limitation herein.

As an optional technical solution of the present application, the ion conductivity of the polymer electrolyte is from $0.7 \times 10^{-3}$ S/cm to $2.0 \times 10^{-3}$ S/cm; specifically, it may be $0.7 \times 10^{-3}$ S/cm, $0.8 \times 10^{-3}$ S/cm, $0.9 \times 10^{-3}$ S/cm, $1.0 \times 10^{-3}$ S/cm, $1.1 \times 10^{-3}$ S/cm, $1.2 \times 10^{-3}$ S/cm, $1.3 \times 10^{-3}$ S/cm, $1.4 \times 10^{-3}$ S/cm, $1.5 \times 10^{-3}$ S/cm, $1.6 \times 10^{-3}$ S/cm, $1.7 \times 10^{-3}$ S/cm or $2.0 \times 10^{-3}$ S/cm, etc, of course, it may also be other values in the above range, without limitation herein.

As an optional technical solution of the present application, the electrochemical stability window of the polymer electrolyte is from 4.5 V to 6 V; specifically, it may be 4.5 V, 4.6 V, 4.7 V, 4.8 V, 4.9 V, 5.0 V, 5.2 V, 5.5 V, 5.7 V, 5.9 V or 6 V, etc, of course, it may also be other values in the above range, without limitation herein. It can be understood that the electrochemical stability window of the polymer electrolyte film is up to 4.5 V or more, and therefore the polymer electrolyte film has high voltage withstand ability, and can be matched with the high-voltage electrode material so as to improve the power and energy density of the battery.

As an optional technical solution of the present application, the polymer electrolyte is the polymer electrolyte film which has a thickness of 5 μm-300 μm and a tensile strength of 0.2 Mpa-20 Mpa.

Specifically, the polymer electrolyte film has a thickness of 5 μm, 7 μm, 10 μm, 15 μm, 20 μm, 25 μm, 30 μm, 40 μm, 50 μm, 60 μm, 70 μm, 80 μm, 100 μm, 150 μm, 180 μm, 200 μm, 250 μm, 280 μm or 300 μm, etc, of course, it may also be other values in the above range, without limitation herein. If the polymer electrolyte film is too thick, it can lead to large impedance of the film; if the polymer electrolyte film is too thin, it can cause the crack of the film layer.

The tensile strength of the polymer electrolyte film may be 0.72 Mpa, 0.75 Mpa, 1.2 Mpa, 1.5 Mpa, 1.7 Mpa, 2.0 Mpa, 2.5 Mpa, 2.7 Mpa, 3.5 Mpa, 3.8 Mpa, 4.2 Mpa, 4.5 Mpa, 4.8 Mpa or 5 Mpa, etc, of course, it may also be other values in the above range, without limitation herein. If the tensile strength of the polymer electrolyte film is in the above range, it represents that the polymer electrolyte film has good mechanical property, sufficient elasticity can also effectively buffer the impact of an external force existing in the processes of use, transport and production on the solid battery and electrode internal stress produced in the process of electrochemical cycling of the battery itself, such as expansion and shrinkage, thereby avoiding problems such as interface detachment, electrolyte layer peel and fracture which are caused by internal and external forces and can degrade battery performance, reducing the probability of the circuit short of the battery, and enhancing the stability of the solid battery.

In a second aspect, the embodiments of the present application provide a preparation method of a polymer electrolyte, the method including the following steps:

Step S10, mixing a carboxylic acid compound with an alcohol compound and performing esterification reaction for 5 h-24 h under the conditions of heating and stirring to obtain an ester compound containing an epoxy multi-element ring;

Step S20, dissolving the ester compound containing the epoxy multi-element ring into conjugated aromatic hydrocarbon, and adding an electrolyte solution including an organic solvent and a lithium salt to obtain a mixed solution; and Step S30, adding the mixed solution into a dry cell equipped with a cathode and an anode, and heated after sealing to obtain an in-situ cured electrolyte.

In the above solution, the ester compound containing the epoxy multi-element ring is dissolved into the conjugated aromatic hydrocarbon, the polymer is formed by in-situ polymerization, the large π conjugated ring on the side chain of the molecular chain of the polymer has a strong electron donating ability, and the carbonyl and epoxy multi-element ring on the other side chain have a strong electron withdrawing ability. Extremely strong charge transfer can occur between the side chains to promote the alternating copolymerization of monomers of different side chains. After a lithium salt is added to introduce lithium ions, the lithium ions can be complexed with carbonyl and the epoxy multi-element ring so that the electron withdrawing ability of the monomer corresponding to the carbonyl and epoxy side group is enhanced and the probability of alternating copolymerization with the monomer corresponding to the conjugated side group is increased, so as to prepare the molecular chain of the polymer through alternating copolymerization.

Next, this solution will be described in detail:

Step S10, mixing a caroxylic acid compound with an alcohol compound and reacting for 5 h-24 h under the conditions of heating and stirring to obtain an ester compound containing an epoxy multi-element ring.

In some embodiments, the caroxylic acid compound includes at least one of 3-tetrahydrofuroic acid and tetrahydropyran-4-carboxylic acid.

In some embodiments, the alcohol compound includes at least one of oxybutane-3-methanol, 3-oxybutanol, 4-oxyhexanol and glycidol.

In some embodiments, a catalyst is also added in the step of mixing the caroxylic acid compound with the alcohol compound, which includes at least one of sodium p-toluenesulfonate and sulfuric acid.

In some embodiments, the temperature of heating and stirring is 30° C.-70° C., specifically it may be 30° C., 40° C., 45° C., 50° C., 55° C., 60° C., 65° C. or 70° C., of course, it may also be other values in the above range, without limitation herein. The time of heating and stirring is 5 h-24 h, specifically it may be 5 h, 6 h, 10 h, 12 h, 18 h or 24 h, etc, of course, it may also be other values in the above range, without limitation herein.

Step S20, dissolving the ester compound containing the epoxy multi-element ring into conjugated aromatic hydrocarbon, and adding an electrolyte solution including an organic solvent and a lithium salt to obtain a mixed solution.

In some embodiments, the conjugated aromatic hydrocarbon is conjugated aromatic hydrocarbon containing an epoxy group, specifically it may include at least one of 1-(1,2-epoxyethyl) naphthalene, 1-(1,2-epoxyethyl) acenaphthene, 1-(1,2-epoxyethyl) pyrene, 1-(3-oxobutyryl) pyrene, 1-(3-oxobutyl) anthracene and 1-(1,2-epoxyethyl) phenanthrene.

In some embodiment, the electrolyte solution includes an organic solvent and a lithium salt. The organic solvent includes a carbonate compound including at least one of ethyl carbonate, propylene carbonate, diethyl carbonate, dimethyl carbonate, methyl ethyl carbonate, ethylene carbonate, propylene carbonate, and butene carbonate. It can be understood that the carbonate compound has a carbonate compound group, the polar group (such as etheroxy group and ester group) contained in the main chain of the polymer has a similar dissolution effect to the carbonate compound, thereby improving the interaction between the organic solvent and the molecular chain of the polymer in the electrolyte solution and then enhancing the absorption ability of the polymer on the organic solvent in the electrolyte solution.

In some embodiments, the carbonate compound in the electrolyte solution is 30%-95%, specifically it may be 30%, 35%, 40%, 45%, 50%, 55%, 60%, 65%, 70%, 75% or 95%, etc, of course, it may also be other values in the above range, without limitation herein.

In some embodiments, the lithium salt includes at least one of lithium hexafluorophosphate, lithium tetrafluoroborate, lithium difluorophosphate, lithium bis(trifluoromethanesulfonyl)imide, lithium bis(fluorosulfonyl)imide, lithium oxalate or lithium difluorooxalate.

In some embodiments, the concentration of the lithium salt in the electrolyte solution is 0.5 mol/L-2 mol/L, specifically, it may be 0.5 mol/L, 0.7 mol/L, 0.9 mol/L, 1.0 mol/L, 1.2 mol/L, 1.5 mol/L or 2.0 mol/L, etc, of course, it may also be other values in the above range, without limitation.

Step S30, adding the mixed solution into the dry cell equipped with a cathode and an anode, sealing and then thermally curing to obtain an in-situ cured polymer electrolyte.

The heating rate for thermal curing is 0.05° C./min-5° C./min, specifically it may be 0.05° C./min, 0.1° C./min, 0.2° C./min, 0.5° C./min, 1° C./min, 1.5° C./min, 2° C./min, 3° C./min or 5° C./min, without limitation herein. The mixed solution in the cell is slowly heated by controlling the heating rate for thermal curing, the mixed solution can sufficiently infiltrate the cell to ensure that the polymer is sufficiently moistened and distributed in the cell, at the same time, too rapid heating is avoided that causes fast generated polymer electrolyte gel to hinder the diffusion of a monomer and a lithium salt in a cell system so that the monomer can sufficiently react and transform, preferably, the heating rate for thermal curing is 0.2° C./min-2° C./min.

The temperature for thermal curing is 50° C.-80° C., the time of thermal curing is 12 h-36 h, specifically, the temperature for thermal curing is 50° C., 55° C., 60° C., 65° C., 70° C., 75° C., 78° C. or 80° C., etc, the time of thermal curing is 12 h, 18 h, 24 h, 32 h or 36 h, etc, of course, they can also be other values in the above ranges, without limitation. It is noted that in the process of thermal curing, the acid radical ions in the lithium salt, as Lewis acid, catalyze the epoxy multi-element ring in the ester compound in the mixed solution to perform ring opening polymerization reaction to form the molecular chain of the polymer, and the prepared polymer electrolyte includes the polymer and the electrolyte solution above-mentioned. The electrolyte solution includes an organic solvent and a lithium salt whose specific form is described as above, without being detailed herein.

In the above solution, the mixed solution containing an organic monomer is injected into the cell. Since the organic monomer (the ester compound and conjugated aromatic hydrocarbon) is in a liquid state, it has extremely good infiltration on cathode and anode plates in the cell, and then a semi-solid battery that achieves molecular-level contact between electrolyte and electrodes is obtained through in-situ thermal curing, thereby greatly improving the interface performance.

In some embodiments, the anode active material in the anode plate can be a graphite anode material, a silicon-based anode material, etc. The cathode active material in the cathode plate can be a high nickel ternary anode material, and the diaphragm can be a porous skeleton material such as a polypropylene, polyethylene or cellulose film.

In a third aspect, the embodiments of the present application provide a lithium ion battery which includes the polymer electrolyte according to the first aspect.

Next, the embodiments of the present disclosure will be further described in combination with multiple examples. Where, the embodiments of the present disclosure are not limited to the following specific examples. The examples can be properly changed without changing the scope of main claims.

Example 1

(1) 120 g of 3-tetrahydrofuranic acid and 10 g of sodium p-toluenesulfonate were dissolved into 100 mL of 3-oxocyclobutanol, heated and evenly mixed at 60° C., and reacted for 12 h under the condition of stirring, and then the reaction product was filtered via a silica gel column and dried through rotary evaporation to obtain ester compound A.

(2) The ester compound A was dissolved into 150 g of 1-(1,2-epoxyethyl)naphthalene at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 1° C./min and underwent curing reaction for 24 h, and then polymer P1 (represented by Formula I-1) and a corresponding semi-solid battery were obtained through in-situ thermal curing.

Where, in the polymer P1, $R_1$ is naphthyl, $R_2$ is 3-oxocyclobutyl, $n_1=1$, $n_2=1$, $n_3=16$, $a=0$, $b=1$, $c=2$, and $d=1$.

Formula I-1

Example 2

This example differs from example 1 in that:

(2) The ester compound A was dissolved into 170 g of 1-(1,2-epoxyethyl)acenaphthene phase at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 1.5° C./min and reacted for 24 h, and then polymer P2 (represented by Formula I-2) and a corresponding semi-solid battery were obtained through in-situ thermal curing.

Where, in the polymer P2, $R_1$ is fluorenyl, $R_2$ is 3-oxo-cyclobutyl, $n_1=1$, $n_2=1$, $n_3=15$, $a=0$, $b=1$, $c=2$, and $d=1$.

Formula I-2

Example 3

This example differs from example 1 in that:

(2) The ester compound A was dissolved into 200 g of 1-(1,2-epoxyethyl)pyrene at a drying atmosphere, and then an electrolyte solution containing 180 g of lithium hexafluorophosphate, 20 g of lithium tetrafluoroborate, 100 g of ethyl carbonate and 50 g of fluoroethylene carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 1° C./min and reacted for 24 h, and then polymer P3 (represented by Formula I-3) and a corresponding semi-solid battery were obtained through in-situ thermal curing.

Where, in the polymer P3, $R_1$ is pyrenyl, $R_2$ is 3-oxocyclobutyl, $n_1=1$, $n_2=1$, $n_3=18$, $a=0$, $b=1$, $c=2$, and $d=1$.

Formula I-3

Example 4

(1) 120 g of 3-tetrahydrofuranic acid and 10 g of sodium p-toluenesulfonatewere dissolved into 100 mL of 4-oxyhexanol, heated and evenly mixed at 60° C., and reacted for 12 h under the condition of stirring, and then the reaction product was filtered via a silica gel column, and dried through rotary evaporation to obtain ester compound B.

(2) The ester compound B was dissolved into 150 g of 1-(1,2-epoxyethyl)naphthalene at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 2° C./min and underwent curing reaction for 24 h, and then polymer P4 (represented by Formula I-4) and a corresponding semi-solid battery were obtained through in-situ thermal curing.

Where, in the polymer P4, $R_1$ is naphthyl, $R_2$ is 4-oxocyclohexyl, $n_1=1$, $n_2=2$, $n_3=15$, $a=0$, $b=1$, $c=2$, and $d=1$.

Formula I-4

Example 5

(1) 120 g of 3-tetrahydrofuranic acid and 10 g of sodium p-toluenesulfonate were dissolved into 100 mL of glycidol, heated and evenly mixed at 60° C., and reacted for 12 h under the condition of stirring, and then the reaction product was filtered via a silica gel column and dried through rotary evaporation to obtain ester compound C.

(2) The ester compound C was dissolved into 200 g of 1-(3-oxocyclobutyl) pyrene at a drying atmosphere, and then an electrolyte solution containing 100 g of lithium difluorosulfonamide, 20 g of lithium tetrafluoroborate, 80 g of ethyl carbonate and 100 g of fluoroethylene carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 0.1° C./min and underwent curing reaction for 24 h, and then in-situ thermal curing was performed to obtain polymer P5 (represented by Formula I-5) and a corresponding semi-solid battery.

Where, in the polymer P1, $R_1$ is naphthyl, $R_2$ is 2,3-epoxypropyl, $n_1=1$, $n_2=3$, $n_3=18$, $a=1$, $b=1$, $c=2$, and $d=1$.

Formula I-5

Example 6

This example differs from example 1 in that:

(2) The ester compound A was dissolved into 180 g of 1-(3-oxocyclobutyl)anthracene at a drying atmosphere, and then an electrolyte solution containing 180 g of lithium hexafluorophosphate, 20 g of lithium tetrafluoroborate, 100 g of ethyl carbonate and 50 g of fluoroethylene carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 1° C./min and reacted for 24 h, and then polymer P6 (represented by Formula I-6) and a corresponding semi-solid battery were obtained through in-situ thermal curing.

Where, in the polymer P6, $R_1$ is anthryl, $R_2$ is 3-oxocyclobutyl, $n_1=1$, $n_2=1$, $n_3=14$, $a=0$, $b=1$, $c=2$, and $d=1$.

Formula I-6

Example 7

(1) 140 g of tetrahydropyran-4-carboxylic acid and 10 g of sodium p-toluenesulfonate were dissolved into 100 mL of 4-oxocyclobutanol, heated and evenly mixed at 60° C., and reacted for 12 h under the condition of stirring, and then the reaction product was filtered via a silica gel column and dried through rotary evaporation to obtain ester compound D.

(2) The ester compound D was dissolved into 220 g of 1-(1,2-epoxyethyl)phenanthrene at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 70° C. under the condition that a heating rate was controlled to 1° C./min and underwent curing reaction for 18 h, and then polymer P7 (represented by Formula I-7) and a corresponding semi-solid battery were obtained through in-situ thermal curing.

Where, in the polymer P7, $R_1$ is phenanthryl, $R_2$ is 4-oxocyclobutyl, $n_1=1$, $n_2=2$, $n_3=16$, $a=0$, $b=1$, $c=2$, and $d=2$.

Formula I-7

Example 8

(1) 130 g of tetrahydropyran-3-carboxylic acid and 10 g of sodium p-toluenesulfonate were dissolved into 110 mL of 3-oxocyclobutanol, heated and evenly mixed at 60° C., and reacted for 12 h under the condition of stirring, and then the reaction product was filtered via a silica gel column and dried through rotary evaporation to obtain ester compound E.

(2) The ester compound E was dissolved into 240 g of 1-(4-oxocycloheptane)naphthalene at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.

(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. under the condition that a heating rate was controlled to 3° C./min and reacted for 24 h, and then polymer P8 (represented by Formula I-8) and a corresponding semi-solid battery were obtained through in-situ thermal curing.

Where, in the polymer P8, $R_1$ is naphthyl, $R_2$ is 3-oxocycloheptyl, $n_1=1$, $n_2=1$, $n_3=6$, $a=3$, $b=2$, $c=1$, and $d=3$.

Formula I-8

Comparative Example 1

This comparative example differs from example 1 in that: step (2) was not conducted, compound A was directly subjected to in-situ curing in step (3) to obtain polymer P9 (represented by Formula I-9) and a corresponding semi-solid battery.

Where, in the polymer P9, $R_2$ is 3-oxocyclobutyl, $n_3=20$, $a=0$, $b=0$, $c=2$, and $d=1$.

Formula I-9

Comparative Example 2

This example differs from example 1 in that:
(1) 1-(1,2-epoxyethyl)naphthalene was added into an electrolyte solution containing 180 g of lithium hexafluorophosphate, 20 g of lithium tetrafluoroborate, 200 g of ethyl carbonate and 100 g of methyl ethyl carbonate, and evenly dissolved to obtain a colorless solution.
(2) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. and reacted for 24 h, and then polymer P10 (represented by Formula I-10) and a corresponding semi-solid battery were obtained through in-situ thermal curing.

Where, in the polymer P10, $R_2$ is naphthyl, $n_3=7$, $a=0$, $b=1$, $c=0$, and $d=0$.

Formula I-10

Comparative Example 3

This example differs from example 1 in that:
(2) The ester compound A was dissolved into 170 g of 1,2-epoxypropane at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.
(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. and reacted for 24 h, and then P11 (represented by Formula I-11) and a corresponding semi-solid battery were obtained through in-situ thermal curing.

Where, in the polymer P11, $R_1$ is methyl, $R_2$ is 3-oxocyclobutyl, $n_1=15$, $n_2=8$, $n_3=1$, $a=0$, $b=1$, $c=2$, and $d=1$.

Formula I-11

Comparative Example 4

(1) 120 g of 3-tetrahydrofuranic acid and 10 g of sodium p-toluenesulfonate were dissolved into 100 mL of methanol, heated and evenly mixed at 60° C., and reacted for 12 h under the condition of stirring, and then the reaction product was filtered via a silica gel column and dried through rotary evaporation to obtain ester compound F.
(2) The ester compound F was dissolved into 150 g of 1-(1,2-epoxyethyl) naphthalene at a drying atmosphere, and then an electrolyte solution containing 180 g of lithium hexafluorophosphate, 20 g of lithium tetrafluoroborate, 200 g of ethyl carbonate and 100 g of methyl ethyl carbonate was added, and the above materials were uniformly dissolved to obtain a colorless solution.
(3) The colorless solution was injected into a dry cell equipped with a cathode and an anode during the drying (relative humidity was less than 2%, and a dew point was less than −40° C.), thermally sealed and subjected to standing for 48 h at room temperature, slowly heated to 60° C. and subjected to curing reaction for 24 h, and then polymer P12 (represented by Formula I-12) and a corresponding semi-solid battery were obtained through in-situ thermal curing.

Where, in the polymer P12, $R_1$ is naphtyl, $R_2$ is methyl, $n_1=6$, $n_2=21$, $n_3=1$, $a=0$, $b=1$, $c=2$, and $d=1$.

Formula I-12

Test Method

The above-mentioned polymer electrolyte films prepared in examples 1-8 and comparative examples 1-4 and the electrode plates were superimposed and assembled into a battery, and the performance of the polymer electrolyte film prepared was tested.

(1) Test Method of Ion Conductivity:

A polymer electrolyte film sample was clamped with two stainless steel slices and then put in a 2016 type battery shell, a lithium ion conductivity was measured by using an electrochemical alternating-current impedance spectroscopy method in an electrochemical station (BioLogic Science Instruments) at a frequency range of 0.1 Hz-100 kHz according to $\sigma=L/(R*S)$, in which a was ion conductivity, L was the thickness of an electrolyte, S was a contact area between the electrolyte film and the electrode, and R was an impedance measured by an impedance meter.

(2) Test Method of Electrochemical Stability Window:

A polymer electrolyte film sample was clamped with a stainless steel slice and a lithium slice and put in a 2016 type battery shell, linear sweep voltammetry was performed in an electrochemical station (BioLogic Science Instruments) to measure an electrochemical working window, an initial potential was an open-circuit voltage, a maximum potential was 6 V, and a scanning speed was 10 mV/s.

(3) Peeling Strength of Polymer Electrolyte Film

The peeling strength was tested according to IPC-TM-6502.8 method using Stripper Shimadzu AG-X 50N. A mirror steel plate was wiped with alcohol, a double-sided adhesive tape was pasted onto a mirror copper plate, the adhesive tape must be firmly bonded with the steel plate without bubbles in the process of pasting, a polymer gel electrolyte was applied to the electrode plate, the coated electrode plate was cut into small strips of 25 mm*220 mm, the side coated with the electrolyte was pasted onto the steel plate with double-sided adhesive tape, and the electrode plate was parallel to the steel plate and rolled for 3 times with an automatic roll tester, a peel machine was opened, a peel speed was set to 100 mm/min, the steel plate was clamped with the lower clamp, the electrode plate was clamped with the upper clamp, the peel machine was reset for starting the test, each material was tested for 5 times, and an average value was taken. The following equation was used: $T=P/B$, wherein T is peeling strength, P is average peel force, mN, and B is test width of a sample, mm.

(4) Test Method of Tensile Strength of Polymer Electrolyte Film

The tensile strength and elongation at break of sample type II were measured according to GB/T1040-1992 by using a universal testing machine (Intron 5565), and the tensile speed was 500 mm/min.

(5) Electrochemical Cycle Performance

Nickel cobalt manganese lithium NCM811 was used as a cathode and a silicon oxide carbon composite material as an anode.

The preparation method of the cathode: 80-95% by mass of cathode active material and 1-10% of conductive agent acetylene black were ground and mixed, 1-10% by mass of polyvinylidene fluoride PVDF and 1-methyl-2-pyrrolidone NMP were added, the above materials were ground and mixed to obtain the cathode material, wherein NMP was used for mixing, dispersing and adjusting the viscosity of slurry and was volatilized during the drying, so it is not included in the mass percentage of the cathode material; the cathode material was coated onto the surface of aluminum foil and dried to obtain the cathode.

The preparation method of the anode: 80-95% by mass of silicon oxygen carbon composite anode material was added into 1-10% of conductive agent acetylene black SP to be ground and mixed, 1-5% by mass of sodium carboxymethyl cellulose CMC, 1-5% by mass of polystyrene butadiene copolymer SBR and water were added, the above materials were ground, dispersed and mixed, the obtained mixture was coated onto the surface of the aluminum foil and then dried to obtain an anode plate. The diaphragm was a porous support material for insulating the cathode from the anode, and can adopt a polyethylene diaphragm, a polypropylene diaphragm, polytetrafluoroethylene non-woven fabric, glass fiber non-woven fabric or cellulose non-woven fabric.

In the electrolyte solution, the mass fraction of the electrolyte solutions such as ethyl carbonate, methyl ethyl carbonate and ethyl propionate was 5-80%, the mass fraction of the lithium salt was 10-50%, and the mass fraction of the polymer monomer was 5-80%. The electrolyte solutions were mixed and injected into a battery system including the cathode, the diaphragm and the anode, pre-sealed and underwent standing at room temperature, infiltrated for 24-72 h, and then heated at 50-100° C. to be thermally cured.

Test mechanism of pouch battery: the battery is transformed, charged for 60 min with a 0.02 C constant current, then for 60 min with a 0.05 C constant current, then for 120 min with a 0.1 C constant current, and subsequently for 180 min with a 0.2 C constant current, the upper limit voltage was 3.9 V, the battery was charged with a constant current of 1 C and then subjected to constant voltage, i.e., room-temperature cycle was performed in a manner of CC-CV, and the charging-discharging cur-off voltage was 2.75-4.2 V.

Test results of examples 1-8 and comparative examples 1-4 are seen in Table 1:

TABLE 1

| Sample | Lithium ion conductivity (S/cm) | Electrochemical stability window (V) | Tensile strength (Mpa) | Peeling strength (mN/mm) | Capacity retention rate (%) |
|---|---|---|---|---|---|
| Example 1 | $1.6 \times 10^{-3}$ | 5.2 | 1.12 | 650 | 93 |
| Example 2 | $1.2 \times 10^{-3}$ | 5.1 | 1.15 | 620 | 92 |
| Example 3 | $1.1 \times 10^{-3}$ | 5.1 | 1.18 | 600 | 91 |

TABLE 1-continued

| Sample | Lithium ion conductivity (S/cm) | Electrochemical stability window (V) | Tensile strength (Mpa) | Peeling strength (mN/mm) | Capacity retention rate (%) |
|---|---|---|---|---|---|
| Example 4 | $1.5 \times 10^{-3}$ | 5.2 | 1.08 | 610 | 90 |
| Example 5 | $1.4 \times 10^{-3}$ | 5.1 | 1.06 | 634 | 94 |
| Example 6 | $1.0 \times 10^{-3}$ | 5.0 | 1.12 | 590 | 88 |
| Example 7 | $1.1 \times 10^{-3}$ | 4.9 | 1.04 | 580 | 87 |
| Example 8 | $0.7 \times 10^{-3}$ | 4.5 | 0.72 | 350 | 73 |
| Comparative example 1 | $2.2 \times 10^{-4}$ | 4.0 | 0.55 | 84 | 42 |
| Comparative example 2 | $1.0 \times 10^{-4}$ | 3.8 | 0.59 | 32 | 35 |
| Comparative example 3 | $2.6 \times 10^{-4}$ | 3.9 | 0.65 | 125 | 53 |
| Comparative example 4 | $1.6 \times 10^{-4}$ | 3.9 | 0.46 | 92 | 36 |

Figure 1:
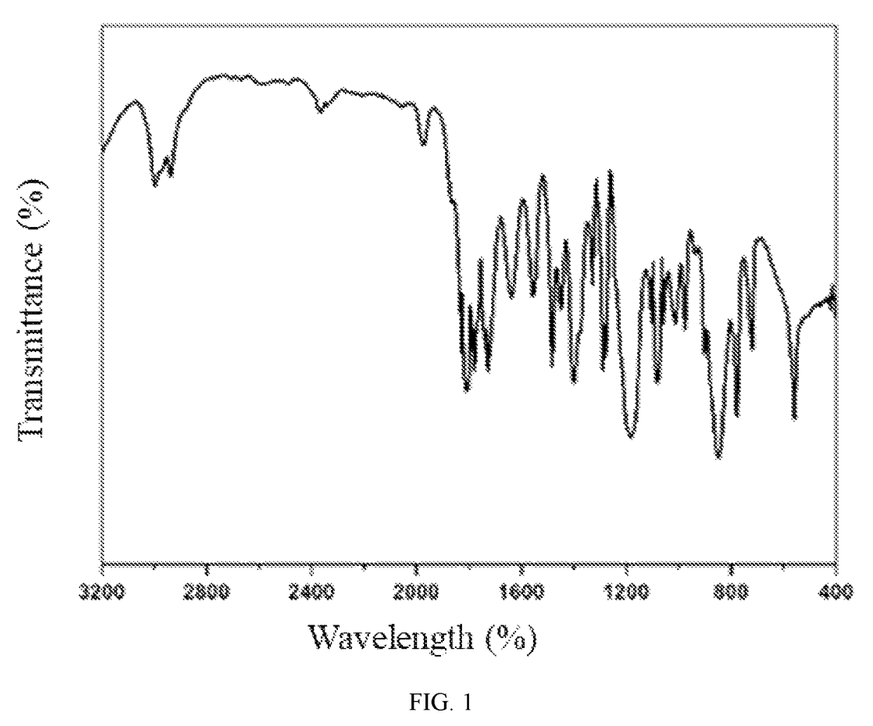
FIG. 1 is an infrared spectroscopy test graph of a polymer electrolyte film provided in example 1 according to the present application.

It can be seen from FIG. 1 that the corresponding functional group of the polymer in the polymer electrolyte prepared in example 1 at 3000 cm$^{-1}$ wavelength of infrared spectroscopy is the carbon oxygen bond of the conjugated large π ring, and the corresponding functional group at 1180 cm$^{-1}$ wavelength is the carbon oxygen bond of the epoxy multi-element ring, which corresponds to the chemical structure of polymer P1 (as shown in formula I-1).

Figure 2:
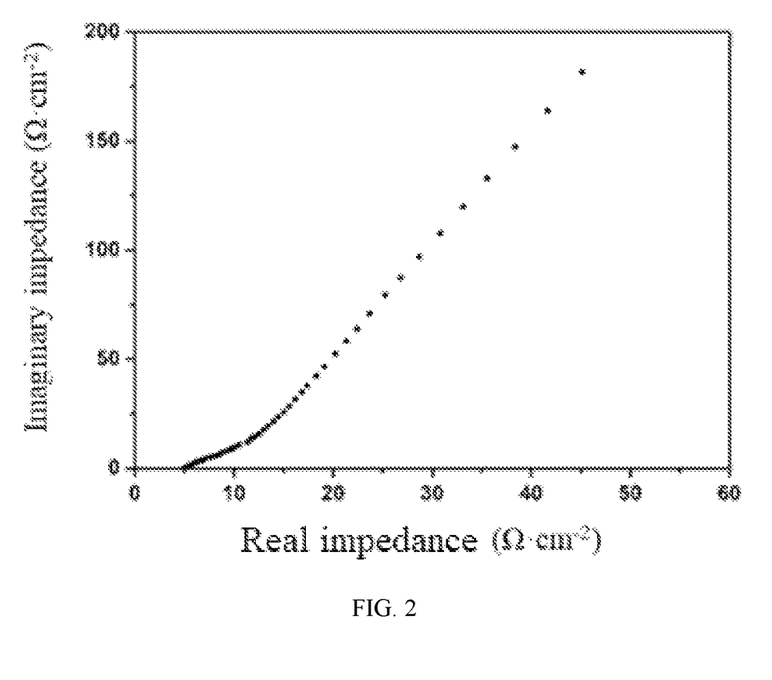
FIG. 2 is a diagram showing an ion conductivity test results of a polymer electrolyte film provided in example 1 according to the present application.
Figure 3:
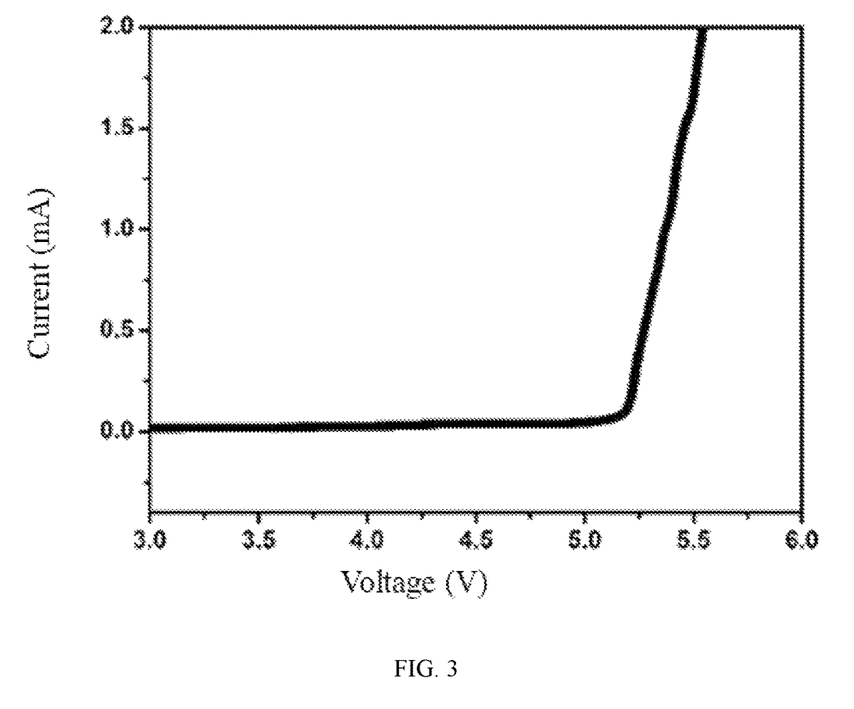
FIG. 3 is a diagram showing electrochemical stability window test results of a polymer electrolyte film provided in example 1 according to the present application.
Figure 4:
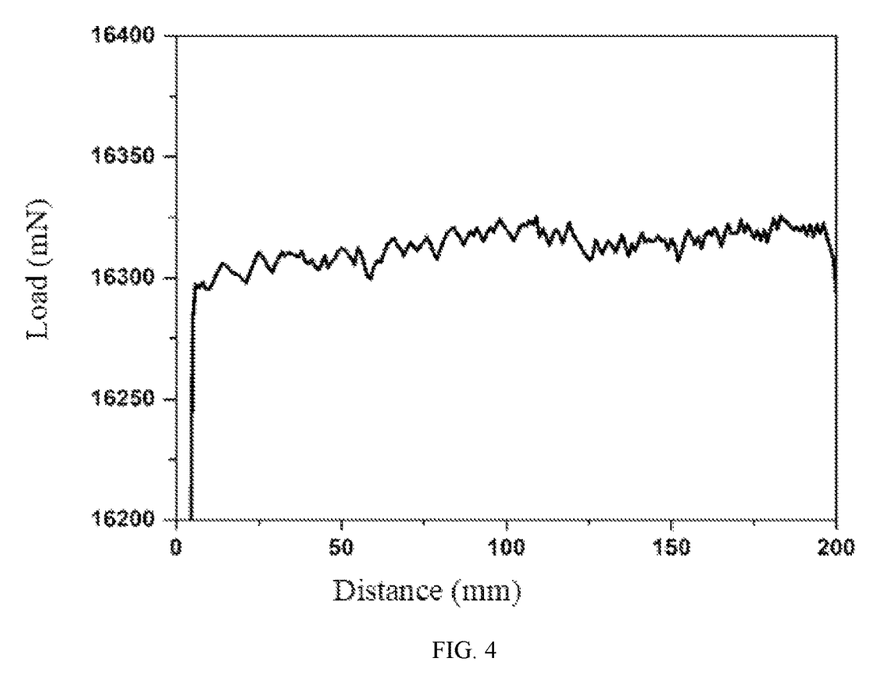
FIG. 4 is a diagram showing peeling strength test results of a polymer electrolyte film provided in example 1 according to the present application.

As shown in FIG. 2, the polymer electrolyte film prepared in example 1 has high lithium ion conductivity, and can rapidly conduct lithium ions; as shown in FIG. 3, the polymer electrolyte characterized by the electrochemical stability window of the polymer electrolyte film prepared in example 1 has high voltage withstand ability and high electrochemical stability, which is beneficial for improving the stability of the polymer electrolyte interface. As shown in FIG. 4, the polymer electrolyte film prepared in example 1 has extremely good peeling strength, can ensure the adhesion of the polymer electrolyte and the electrode active material, can improve the stability of the polymer electrolyte interface, and improves the cycle stability of the battery.

The molecular chain of the polymer in the polymer electrolyte prepared in comparative example 1 has no side chain with a conjugated aromatic structure, nor π-π interaction between the conjugated large π ring and the carbon layer on the particle surface of the electrode active material. Compared with example 1, the tensile strength and peeling strength are both greatly reduced. Since the adhesive force of the polymer electrolyte is reduced, the interface is prone to detachment in the lithium deintercalation process, and the capacity retention rate of the battery is also significantly decreased.

The molecular chain of the polymer in the polymer electrolyte prepared in comparative example 2 only has a side chain with a conjugated aromatic structure, and has no side chain with an epoxy multi-element ring, thus the polymer electrolyte difficultly reacts with the defects on the carbon layer structure of the surface of the electrode active material, and the connection strength between the polymer molecule and the electrode active substance is greatly reduced, the adhesion of the polymer electrolyte is also reduced, the interface is prone to detachment, and the capacity retention rate of the battery is obviously decreased either.

Comparative example 3 is similar to comparative example 1, the molecular chain of the polymer has no side chain with a conjugated aromatic structure, the adhesive force of the polymer electrolyte is decreased, and the interface is prone to detachment, and the capacity retention rate of the battery is obviously reduced either.

Comparative example 4 is similar to comparative example 2, the molecular chain of the polymer has no side chain with an epoxy multi-element ring, the adhesive force of the polymer electrolyte is decreased, and the interface is prone to detachment, and the capacity retention rate of the battery is obviously reduced either.

It can be seen that when the molecular chain of the polymer has the side chain with the conjugated aromatic structure and the side chain with the epoxy multi-element ring, interaction between the conjugated ring π-π accumulation and the epoxy multi-element ring bond can be achieved, the adhesion of the polymer on the electrode active material is improved, the peeling strength of the polymer electrolyte film on the plate is improved, and then the stability of the interface is improved.

The present application has been disclosed with preferred embodiments, but are not intended to limit the claims, several variations and modifications can be made by those skilled in the art without departing from the concept of the present application, and therefore the scope of protection of the present application should be based on the scope defined by the claims of the present application.

What is claimed is:

1. A polymer, the polymer comprising a main chain and side chains of the polymer, the side chains containing conjugated cyclic groups and multi-element ring tension cyclic groups, and a molecular form of the polymer being represented by Formula I:

Formula I wherein, $R_1$ consists of the conjugated cyclic group selected from saturated or unsaturated C10-C20 conjugated aromatic groups, and $R_2$ is the multi-element ring tension cyclic group;

$n_1$ and $n_2$ are each selected from natural numbers from 1 to 5; $n_3$ is in a range from 5 to 50;

a, b, c and d are each selected from natural numbers from 0 to 5.

2. The polymer according to claim 1, comprising at least one of the following features (1)-(2):
   (1) the epoxy multi-element ring tension cyclic group is selected from saturated or unsaturated C3-C8 multi-element ring tension cyclic groups;
   (2) the main chain of the polymer is selected from polyalkoxy ether.

3. The polymer according to claim 2, comprising at least one of the following features (1)-(2):
   (1) the conjugated aromatic group is selected from at least one of saturated or unsaturated naphthyl, acenaphthenyl, terpenyl, phenanthryl, anthracyl, fluoranthenyl, pyrenyland biphenyl;
   (2) the multi-element ring tension cyclic group is selected from at least one of epoxy ethyl, epoxy propyl, dioxocyclopropyl, oxocyclobutyl, oxocyclopentyl and pyranyl, oxocyclohexyl and dioxocyclohexyl.

4. The polymer according to claim 1, wherein a, b, c and d are each selected from 0, 1 or 2.

5. A polymer electrolyte, the polymer electrolyte comprising an electrolyte solution and the polymer according to claim 1.

6. The polymer electrolyte according to claim 5, wherein the polymer electrolyte meets at least one of the following features (1)-(3):
   (1) a mass percentage of the polymer in the polymer electrolyte is W %, and 20≤W≤80;
   (2) in an infrared absorption spectrum, a light transmission peak intensity of the polymer electrolyte in a wavelength range of 2950 $cm^{-1}$-3000 $cm^{-1}$ is $A_1$, a light transmission peak intensity of the polymer electrolyte in a wavelength range of 1150 $cm^{-1}$-1180 $cm^{-1}$ is $A_2$, and $2 \leq A_1/A_2 \leq 4$;
   (3) a peeling strength of the polymer electrolyte is T mN/mm, and $T \geq A_1/A_2 * W * 300$.

7. The polymer electrolyte according to claim 5, wherein the polymer electrolyte meets at least one of the following features (1)-(3):
   (1) an ion conductivity of the polymer electrolyte is from $0.7 \times 10^{-3}$ S/cm to $2.0 \times 10^{-3}$ S/cm;
   (2) an electrochemical stability window of the polymer electrolyte is from 4.5 V to 6 V;
   (3) an ion transport number of the polymer electrolyte is from 0.2 to 0.7.

8. The polymer electrolyte according to claim 5, wherein the polymer electrolyte meets at least one of the following features (1)-(4):
   (1) the polymer electrolyte is a polymer electrolyte film;
   (2) a thickness of the polymer electrolyte film is from 5 μm to 300 μm;
   (3) a tensile strength of the polymer electrolyte film is from 0.72 Mpa to 5 Mpa;
   (4) a peeling strength of the polymer electrolyte film is from 350 mN/mm to 650 mN/mm.

9. A lithium ion battery, the lithium ion battery comprising the polymer electrolyte according to claim 6.

10. The polymer electrolyte according to claim 5, wherein the polymer comprises at least one of the following features (1)-(2):
    (1) the multi-element ring tension cyclic group is selected from saturated or unsaturated C3-C8 multi-element ring tension cyclic groups;
    (2) the main chain of the polymer is selected from polyalkoxy ether.

11. The polymer electrolyte according to claim 10, wherein the polymer comprises at least one of the following features (1)-(2):
    (1) the conjugated aromatic group is selected from at least one of saturated or unsaturated naphthyl, acenaphthenyl, terpenyl, phenanthryl, anthracyl, fluoranthenyl, pyrenyland biphenyl;
    (2) the multi-element ring tension cyclic group is selected from at least one of epoxy ethyl, epoxy propyl, dioxocyclopropyl, oxocyclobutyl, oxocyclopentyl and pyranyl, oxocyclohexyl and dioxocyclohexyl.

12. The polymer electrolyte according to claim 5, wherein in the polymer, a, b, c and d are each selected from 0, 1 or 2.

13. The lithium ion battery according to claim 9, wherein the polymer electrolyte meets at least one of the following features (1)-(3):
    (1) a mass percentage of the polymer in the polymer electrolyte is W %, and 20≤W≤80;
    (2) in an infrared absorption spectrum, a light transmission peak intensity of the polymer electrolyte in a wavelength range of 2950 $cm^{-1}$-3000 $cm^{-1}$ is $A_1$, a light transmission peak intensity of the polymer electrolyte in a wavelength range of 1150 $cm^{-1}$-1180 $cm^{-1}$ is $A_2$, and $2 \leq A_1/A_2 \leq 4$;
    (3) a peeling strength of the polymer electrolyte is T mN/mm, and $T \geq A_1/A_2 * W * 300$.

14. The lithium ion battery according to claim 9, wherein the polymer electrolyte meets at least one of the following features (1)-(3):
    (1) an ion conductivity of the polymer electrolyte is from $0.7 \times 10^{-3}$ S/cm to $2.0 \times 10^{-3}$ S/cm;
    (2) an electrochemical stability window of the polymer electrolyte is from 4.5 V to 6 V;
    (3) an ion transport number of the polymer electrolyte is from 0.2 to 0.7.

15. The lithium ion battery according to claim 9, wherein the polymer electrolyte meets at least one of the following features (1)-(4):
    (1) the polymer electrolyte is a polymer electrolyte film;
    (2) a thickness of the polymer electrolyte film is from 5 μm to 300 μm;
    (3) a tensile strength of the polymer electrolyte film is from 0.72 Mpa to 5 Mpa;
    (4) a peeling strength of the polymer electrolyte film is from 350 mN/mm to 650 mN/mm.

* * * * *